United States Patent
Mouri et al.

(10) Patent No.: US 12,050,205 B2
(45) Date of Patent: Jul. 30, 2024

(54) MATERIAL TESTING MACHINE AND CONTROL METHOD OF MATERIAL TESTING MACHINE

(71) Applicant: SHIMADZU CORPORATION, Kyoto (JP)

(72) Inventors: Mitsuhiro Mouri, Kyoto (JP); Hiroshi Tsuji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 258 days.

(21) Appl. No.: 17/519,573

(22) Filed: Nov. 5, 2021

(65) Prior Publication Data

US 2022/0170833 A1 Jun. 2, 2022

(30) Foreign Application Priority Data

Dec. 2, 2020 (JP) ................ 2020-200222

(51) Int. Cl.
*G01N 3/08* (2006.01)
*G01N 3/06* (2006.01)
*G01N 3/62* (2006.01)

(52) U.S. Cl.
CPC ............. *G01N 3/08* (2013.01); *G01N 3/068* (2013.01); *G01N 3/62* (2013.01); *G01N 2203/0017* (2013.01); *G01N 2203/021* (2013.01); *G01N 2203/0688* (2013.01)

(58) Field of Classification Search
CPC ........... G01N 3/08; G01N 3/068; G01N 3/62; G01N 2203/0017; G01N 2203/021; G01N 2203/0688
See application file for complete search history.

(56) References Cited

U.S. PATENT DOCUMENTS

| 8,706,429 | B2* | 4/2014 | Nakajima | G01L 5/161 |
| | | | | 702/56 |
| 10,871,408 | B2* | 12/2020 | Matsuura | G01N 3/066 |
| 2018/0178313 | A1* | 6/2018 | Nakayama | B23K 20/26 |
| 2019/0086279 | A1 | 3/2019 | Matsuura | |
| 2019/0234847 | A1* | 8/2019 | Matsuura | G01N 3/066 |
| 2020/0271558 | A1* | 8/2020 | Matsuura | G01N 3/10 |

(Continued)

FOREIGN PATENT DOCUMENTS

| JP | H03111735 | | 5/1991 |
| JP | H05164746 | A * | 6/1993 |
| JP | 2005331256 | A * | 12/2005 |

(Continued)

OTHER PUBLICATIONS

Office Action of Japan Counterpart Application, with English translation thereof, issued on Dec. 5, 2023, pp. 1-7.

*Primary Examiner* — Octavia Hollington
(74) *Attorney, Agent, or Firm* — JCIPRNET (57) ABSTRACT

The disclosure provides a tensile testing machine and includes: a processing filter that removes a noise component included in a test force measurement signal output from a load cell; and an adjustment unit that adjusts a frequency characteristic of the processing filter. The adjustment unit receives a detection signal output from the sensor, and adjusts the frequency characteristic of the processing filter on a basis of a difference between output signals of two low-pass filters having different frequency characteristics.

7 Claims, 3 Drawing Sheets

(56) References Cited

U.S. PATENT DOCUMENTS

2022/0034775 A1\* 2/2022 Matsuura ............ G05B 13/0205
2022/0057308 A1\* 2/2022 Matsuura ................. G01N 3/08

FOREIGN PATENT DOCUMENTS

| JP | 3961258 B2 \* | 8/2007 | ............. B82Y 35/00 |
| JP | 2019056614 | 4/2019 | |
| JP | 2019132767 A \* | 8/2019 | ............. G01D 3/032 |

\* cited by examiner

MATERIAL TESTING MACHINE AND CONTROL METHOD OF MATERIAL TESTING MACHINE

INCORPORATION BY REFERENCE

The present application claims priority under 35 U.S.C.§ 119 to Japanese Patent Application No. 2020-200222 filed on Dec. 2, 2020. The content of the application is incorporated herein by reference in its entirety.

BACKGROUND

Technical Field

The present invention relates to a material testing machine and a control method of a material testing machine.

Related Art

Various techniques for removing a noise component included in a detection signal output from a sensor in a material testing machine are known.

For example, in the material testing machine described in JP 2019-56614 A, it is described that a breaking point is detected as a change point from raw data, the data is divided before and after the breaking point to obtain divided data, low-pass filtering processing is executed for each divided data, when the filtering processing of all the divided data is completed, time-series data from which natural frequencies have been removed are reconstructed before and after the breaking point, and the reconstructed data are connected at the breaking point.

SUMMARY

However, in the material testing machine described in JP 2019-56614 A, it is necessary for the operator to adjust the frequency characteristics of a filter such as a low-pass filter every time the material and shape of a test piece, the type of a gripper, and the like are changed, which is a burden on the operator.

Since the noise component included in the detection signal output from the sensor is often a high frequency, for example, when the cutoff frequency of the low-pass filter is lowered, the noise component can be sufficiently removed, but the responsiveness of the detection signal may be deteriorated. Conversely, when the cutoff frequency of the low-pass filter is increased, the responsiveness of the detection signal is improved, but the noise component may not be sufficiently removed.

The present invention has been made in view of such circumstances, and an object thereof is to provide a material testing machine capable of reducing a burden on an operator.

A material testing machine according to a first aspect of the present invention includes: a processing filter that removes a noise component included in a detection signal output from a sensor; and an adjustment unit that adjusts a frequency characteristic of the processing filter.

According to a second aspect of the present invention, a control method of a material testing machine which includes a processing filter of removing a noise component included in a detection signal output from a sensor, includes: adjusting a frequency characteristic of the processing filter.

Each of the material testing machine according to the first aspect of the present invention and the control method of the material testing machine according to the second aspect of the present invention adjusts the frequency characteristics of the processing filter that removes the noise component included in the detection signal output from the sensor. Therefore, the burden on the operator can be reduced.

DETAILED DESCRIPTION

Hereinafter, this embodiment will be described with reference to the drawings.

1. Configuration of Tensile Testing Machine

Figure 1:
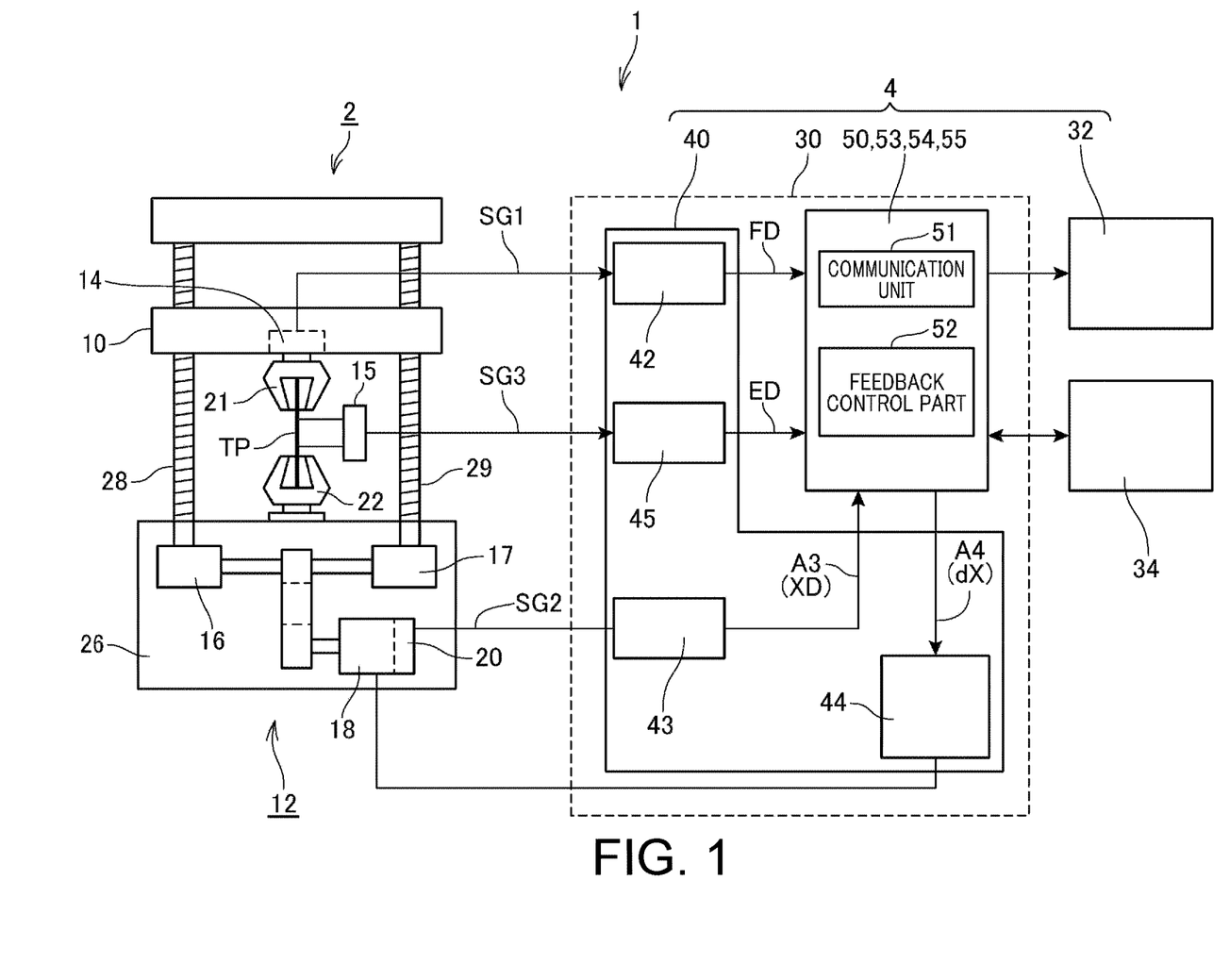
FIG. 1 is a diagram illustrating an example of a configuration of a tensile testing machine according to this embodiment.

FIG. 1 is a diagram illustrating an example of a configuration of a tensile testing machine 1 according to this embodiment.

The tensile testing machine 1 of this embodiment performs a tensile test for measuring mechanical properties such as tensile strength, yield point, elongation, and drawing of a sample by applying a test force F to a test piece TP. The test force F is a tensile force.

The tensile testing machine 1 includes a tensile testing machine body 2 which performs a tensile test by applying a test force F to a test piece TP which is a material to be tested, and a control unit 4 which controls a tensile test operation by the tensile testing machine body 2.

Incidentally, the tensile testing machine 1 corresponds to an example of a "material testing machine".

The testing machine body 2 includes a table 26, a pair of screw rods 28 and 29 rotatably erected on the table 26 in a state of facing the vertical direction, a crosshead 10 movable along the screw rods 28 and 29, a load mechanism 12 which moves the crosshead 10 to apply a load to the test piece TP, and a load cell 14. The load cell 14 is a sensor which measures the test force F, which is a tensile load applied to the test piece TP, and outputs a test force measurement signal SG1.

A load mechanism 12 includes worm reducers 16 and 17 connected to the lower end portions of the screw rods 28 and 29, a servomotor 18 connected to each of the worm reducers 16 and 17, and a rotary encoder 20. The rotary encoder 20 is a sensor which measures the rotation amount of the servomotor 18 and outputs, to the control unit 4, a rotation measurement signal SG2 with the number of pulses corresponding to the rotation amount.

The load mechanism 12 transmits the rotation of the servomotor 18 to the pair of screw rods 28 and 29 via the worm reducers 16 and 17, and the screw rods 28 and 29 rotate in synchronization, whereby the crosshead 10 ascends and descends along the screw rods 28 and 29.

The crosshead 10 is provided with an upper gripper 21 for gripping the upper end portion of the test piece TP, and the table 26 is provided with a lower gripper 22 for gripping the lower end portion of the test piece TP. During the tensile test, in a state where both end portions of the test piece TP are gripped by the upper gripper 21 and the lower gripper 22, the testing machine body 2 raises the crosshead 10 under the control of the control unit 4, thereby applying the test force F to the test piece TP.

The displacement sensor 15 is disposed on the test piece TP. As the test piece TP, for example, a dumbbell-shaped test piece formed with the center constricted is used. The displacement sensor 15 is a sensor which measures an elongation measurement value ED by measuring a distance between a pair of gauge points of the test piece TP and outputs an elongation measurement signal SG3. The pair of gauge points are disposed at an upper portion and a lower portion of the region where the test piece TP is constricted.

The control unit 4 includes an integrated control device 30, a display device 32, and a test program execution device 34.

The integrated control device 30 is a device which centrally controls the testing machine body 2, and is connected to the testing machine body 2 so as to be able to transmit and receive signals to and from the testing machine body 2. Signals received from the testing machine body 2 include the test force measurement signal SG1 output from the load cell 14, the rotation measurement signal SG2 output from the rotary encoder 20, the elongation measurement signal SG3 output from the displacement sensor 15, and appropriate signals required for control and testing.

The display device 32 is a device which includes a liquid crystal display (LCD) or the like and displays various types of information on the basis of the signal input from the integrated control device 30. For example, the integrated control device 30 displays the elongation measurement value ED, which is a measurement value of the elongation of the test piece TP, on the display device 32 on the basis of the elongation measurement signal SG3 during the tensile test. Further, for example, the integrated control device 30 displays, on the display device 32, a displacement measurement value XD indicating the displacement of the crosshead 10 based on the rotation measurement signal SG2 during the tensile test.

The display device 32 corresponds to an example of a "display".

A tensile test program execution device 34 is a device having a function of receiving user operations such as setting operations of various setting parameters such as test conditions of the tensile test and execution instruction operations and outputting the operations to the integrated control device 30, a function of analyzing data of the test force measurement value FD, and the like.

Next, the integrated control device 30 of this embodiment will be further described. The integrated control device 30 includes a signal input/output unit 40 and a control circuit unit 50.

The signal input/output unit 40 configures an input/output interface circuit which transmits and receives signals to and from the testing machine body 2, and in this embodiment, includes a first sensor amplifier 42, a second sensor amplifier 45, a counter circuit 43, and a servo amplifier 44.

The first sensor amplifier 42 is an amplifier which amplifies the test force measurement signal SG1 output from the load cell 14 and outputs the amplified signal to the control circuit unit 50.

The second sensor amplifier 45 is an amplifier which amplifies the elongation measurement signal SG3 output from the displacement sensor 15 and outputs the amplified signal to the control circuit unit 50.

The counter circuit 43 counts the number of pulses of the rotation measurement signal SG2 output from the rotary encoder 20, and outputs, to the control circuit unit 50, a displacement measurement signal A3 indicating the rotation amount of the servomotor 18, that is, the displacement measurement value XD of the crosshead 10 which ascends and descends by the rotation of the servomotor 18 as a digital signal.

The servo amplifier 44 is a device which controls the servomotor 18 according to the control of the control circuit unit 50.

The control circuit unit 50 includes a communication unit 51, a feedback control part 52, and a control part 53.

The control part 53 includes a processor 54 and a memory 55.

The control part 53, the processor 54, and the memory 55 will be described with reference to FIG. 2.

The control circuit unit 50 includes a computer including a storage device such as a hard disk drive (HDD) or a solid state drive (SSD), an interface circuit with the signal input/output unit 40, a communication device which communicates with the tensile test program execution device 34, a display control circuit which controls the display device 32, and various electronic circuits.

Further, the processor 54 of the control part 53 of the control circuit unit 50 executes the control program stored in the memory 55 or the storage device to realize each functional unit illustrated in FIG. 1.

Further, an A/D converter is provided in the interface circuit with the signal input/output unit 40, and the test force measurement signal SG1 and the elongation measurement signal SG3 of an analog signal are converted into digital signals by the A/D converter.

Incidentally, the control circuit unit 50 is not limited to a computer, and may be configured by one or a plurality of appropriate circuits such as an integrated circuit such as an IC chip and an LSI.

The communication unit 51 communicates with the tensile test program execution device 34, and receives the setting of test conditions, the set values of various setting parameters, the execution instruction and an interruption instruction of the tensile test, and the like from the test program execution device 34. Further, the communication unit 51 transmits the elongation measurement value ED based on the elongation measurement signal SG3 and the test force measurement value FD based on the test force measurement signal SG1 to the tensile test program execution device 34 at an appropriate timing. Further, the communication unit 51 transmits the displacement measurement value XD based on the rotation measurement signal SG2 to the tensile test program execution device 34 at an appropriate timing.

The feedback control part 52 performs feedback control of the servomotor 18 of the testing machine body 2 to execute the tensile test. The feedback control part 52 is a circuit which executes feedback control of the servomotor 18.

In a case where the feedback control part 52 executes position control, the feedback control part 52 executes position control on the test force measurement value FD output from the load cell 14, for example. In this case, the feedback control part 52 calculates a command value dX of the displacement measurement value XD such that the test force measurement value FD matches a test force target value FT, and outputs, to the servo amplifier 44, a command signal A4 indicating the command value dX. Incidentally, the test force target value FT indicates a target value of the test force measurement value FD.

Incidentally, the "position control" means that control is performed such that a detection value measured by a sensor or the like matches the target value.

Incidentally, although a case where the position control is executed will be described, the feedback control part 52 may execute speed control. The "speed control" indicates that control is performed such that a change amount per unit time of the detection value measured by a sensor or the like matches a target value thereof.

2. Configuration of Control Circuit Unit

Figure 2:
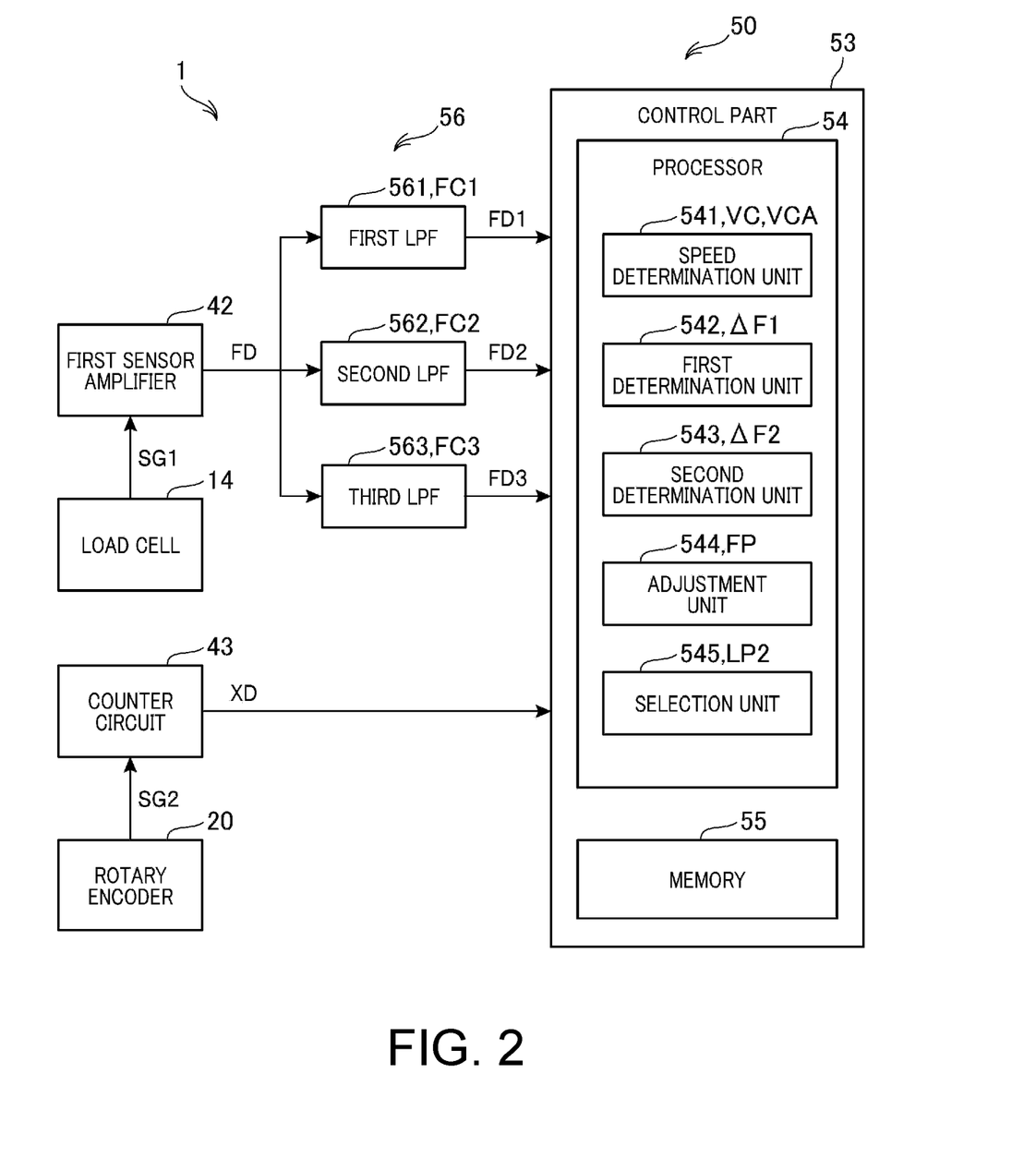
FIG. 2 is a diagram illustrating an example of a configuration of a control circuit unit according to this embodiment.

FIG. 2 is a diagram illustrating an example of a configuration of the control circuit unit 50 according to this embodiment.

The control part 53 includes, for example, a personal computer, and controls the operation of the control circuit unit 50. The control part 53 includes a processor 54 and a memory 55.

The processor 54 includes a central processing unit (CPU), a micro-processing unit (MPU), and the like.

The memory 55 includes a read only memory (ROM), a random access memory (RAM), and the like.

Incidentally, the control part 53 is not limited to the personal computer, and may be configured by one or a plurality of appropriate circuits such as an integrated circuit such as an IC chip and as an LSI. Further, the control part 53 may include, for example, a tablet terminal, a smartphone, or the like.

Furthermore, the control part 53 may include programmed hardware such as a digital signal processor (DSP) or a field programmable gate array (FPGA). Further, the control part 53 may include a system-on-a-chip (SoC)-FPGA.

The control circuit unit 50 further includes, for example, a low-pass filter 56.

The low-pass filter 56 is, for example, a filter which does not attenuate a component having a frequency lower than a cutoff frequency FC and attenuates a component having a frequency higher than the cutoff frequency FC in the test force measurement signal SG1 which is the detection signal of the load cell 14.

Specifically, the load cell 14 outputs the test force measurement signal SG1, which is the detection signal, to the first sensor amplifier 42. The first sensor amplifier 42 amplifies the test force measurement signal SG1 and outputs the test force measurement value FD to the low-pass filter 56. The low-pass filter 56 does not attenuate a component having a frequency lower than the cutoff frequency FC and attenuates a component having a frequency higher than the cutoff frequency FC in the test force measurement value FD.

The low-pass filter 56 corresponds to an example of a "processing filter".

In this embodiment, a case where the processing filter is the low-pass filter 56 will be described, but the processing filter may remove a noise component included in the detection signal output from the sensor. For example, the processing filter may be a band-pass filter.

In this embodiment, a case where the low-pass filter 56 attenuates the high-frequency component included in the test force measurement signal SG1 which is the detection signal of the load cell 14 will be described, but the embodiment of the present invention is not limited thereto. The low-pass filter 56 may attenuate the high-frequency component included in the detection signal of a sensor disposed in the tensile testing machine 1. For example, the low-pass filter 56 may attenuate the high-frequency component included in the elongation measurement signal SG3 which is the detection signal of the displacement sensor 15.

That is, the load cell 14 corresponds to an example of the "sensor".

In other words, in this embodiment, a case where the "sensor" is the load cell 14 will be described, but the "sensor" may be, for example, the displacement sensor 15.

The low-pass filter 56 includes a first low-pass filter 561, a second low-pass filter 562, and a third low-pass filter 563.

The test force measurement value FD is input to each of the first low-pass filter 561 to the third low-pass filter 563. In other words, each of the first low-pass filter 561 to the third low-pass filter 563 attenuates the high-frequency component included in the test force measurement signal SG1 which is the detection signal of the load cell 14.

The first low-pass filter 561 is configured to have excellent responsiveness compared to each of the second low-pass filter 562 and the third low-pass filter 563.

The cutoff frequency FC of the first low-pass filter 561 is a first frequency FC1. The first frequency FC1 is set to be higher than a response frequency FA required for the control of the tensile testing machine 1, for example. The response frequency FA is, for example, 100 Hz. The first frequency FC1 is, for example, 300 Hz. The first low-pass filter 561 outputs a first test force measurement value FD1 to the control part 53.

The first low-pass filter 561 corresponds to an example of "two low-pass filters".

The second low-pass filter 562 is configured to have excellent high frequency noise removal performance compared to the first low-pass filter 561, and is configured to have excellent responsiveness compared to the third low-pass filter 563.

The cutoff frequency FC of the second low-pass filter 562 is a second frequency FC2. The second frequency FC2 is set lower than the first frequency FC1. The second frequency FC2 is, for example, 3 Hz. The second low-pass filter 562 outputs the second test force measurement value FD2 to the control part 53.

The second low-pass filter 562 corresponds to an example of the "two low-pass filters".

Further, the second low-pass filter 562 corresponds to an example of the "processing filter".

The third low-pass filter 563 is configured to have excellent high frequency noise removal performance compared to each of the first low-pass filter 561 and the second low-pass filter 562.

The cutoff frequency FC of the third low-pass filter 563 is a third frequency FC3. The third frequency FC3 is set lower than the second frequency FC2. The third frequency FC3 is, for example, 0.3 Hz. The third low-pass filter 563 outputs a third test force measurement value FD3 to the control part 53.

The third low-pass filter 563 corresponds to an example of the "two low-pass filters".

The third low-pass filter 563 corresponds to an example of the "processing filter".

In addition to the first test force measurement value FD1 to the third test force measurement value FD3, the displacement measurement value XD is input from the counter circuit 43 to the control part 53. The displacement measurement value XD indicates the displacement of the crosshead 10. The displacement measurement value XD is generated by the counter circuit 43 on the basis of the rotation measurement signal SG2 output from the rotary encoder 20.

In this embodiment, the low-pass filter 56 includes three low-pass filters, that is, the first low-pass filter 561 to the third low-pass filter 563, but the low-pass filter 56 may include two low-pass filters. In this case, the configuration and the process can be simplified. Further, the low-pass filter 56 may include four or more low-pass filters. In this case, the frequency characteristics of the processing filter can be further appropriately adjusted.

3. Configuration of Control Part

As illustrated in FIG. 2, the control part 53 includes a speed determination unit 541, a first determination unit 542, a second determination unit 543, an adjustment unit 544, and a selection unit 545.

Specifically, the processor 54 of the control part 53 executes a control program stored in the memory 55 or the storage device to function as the speed determination unit 541, the first determination unit 542, the second determination unit 543, the adjustment unit 544, and the selection unit 545.

The speed determination unit 541 calculates a moving speed VC of the crosshead 10 and determines whether the moving speed VC is equal to or larger than a threshold value VCA.

The speed determination unit 541 calculates the moving speed VC on the basis of the displacement measurement value XD input from the counter circuit 43. Specifically, the speed determination unit 541 calculates a change amount of the displacement measurement value XD per unit time as the moving speed VC.

The first determination unit 542 determines whether a difference between the output signals of two low-pass filters LP2 selected by the selection unit 545 is equal to or larger than a first threshold value $\Delta F1$.

The first threshold value $\Delta F1$ is set on the basis of a full scale FS of the test force measurement value FD. For example, the first threshold value $\Delta F1$ is set to $1/20000$ of the full scale FS of the test force measurement value FD.

For example, in a case where the selection unit 545 selects the first low-pass filter 561 and the second low-pass filter 562 as the two low-pass filters LP2, the first determination unit 542 determines whether the absolute value of the difference between the first test force measurement value FD1 and the second test force measurement value FD2 is equal to or larger than the first threshold value $\Delta F1$.

The second determination unit 543 determines whether the difference between the output signals of the two low-pass filters LP2 selected by the selection unit 545 is equal to or less than a second threshold value $\Delta F2$.

The second threshold value $\Delta F2$ is set to a value larger than the first threshold value $\Delta F1$. For example, the second threshold value $\Delta F2$ is set to a value twice as large as the first threshold value $\Delta F1$.

For example, in a case where the selection unit 545 selects the first low-pass filter 561 and the third low-pass filter 563 as the two low-pass filters LP2, the second determination unit 543 determines whether the absolute value of the difference between the first test force measurement value FD1 and the third test force measurement value FD3 is equal to or less than the second threshold value $\Delta F2$.

In a case where the speed determination unit 541 determines that the moving speed VC is equal to or larger than the threshold value VCA, the adjustment unit 544 sets the third low-pass filter 563 as the processing filter FP. The threshold value VCA is set in advance on the basis of an experimental result or the like.

In a case where the speed determination unit 541 determines that the moving speed VC is less than the threshold value VCA, the adjustment unit 544 adjusts the frequency characteristics of the processing filter FP. The processing filter FP removes a noise component included in the test force measurement signal SG1 output from the load cell 14.

The output signal of the processing filter FP is used as a display signal to be displayed on the display device 32.

The adjustment unit 544 receives the test force measurement signal SG1 output from the load cell 14, and adjusts the frequency characteristics of the processing filter FP on the basis of the difference between the output signals of the two low-pass filters LP2 having different frequency characteristics.

Specifically, the processing filter FP includes a low-pass filter, and the adjustment unit 544 decreases the cutoff frequency of the processing filter FP according to the determination result of the first determination unit 542.

More specifically, the adjustment unit 544 switches the processing filter FP from the second low-pass filter 562 to the third low-pass filter 563 according to the determination result of the first determination unit 542. That is, in a case where the difference between the output signals of the two low-pass filters LP2 selected by the selection unit 545 is equal to or larger than the first threshold value $\Delta F1$, the adjustment unit 544 switches the processing filter FP from the second low-pass filter 562 to the third low-pass filter 563.

For example, in a case where the selection unit 545 selects the first low-pass filter 561 and the second low-pass filter 562 as the two low-pass filters LP2, the first determination unit 542 determines whether the absolute value of the difference between the first test force measurement value FD1 and the second test force measurement value FD2 is equal to or larger than the first threshold value $\Delta F1$. Then, in a case where the first determination unit 542 determines that the absolute value of the difference between the first test force measurement value FD1 and the third test force measurement value FD3 is equal to or larger than the first threshold value $\Delta F1$, the adjustment unit 544 switches the processing filter FP from the second low-pass filter 562 to the third low-pass filter 563.

The adjustment unit 544 increases the cutoff frequency of the processing filter FP according to the determination result of the second determination unit 543.

Specifically, the adjustment unit 544 switches the processing filter FP from the third low-pass filter 563 to the second low-pass filter 562 according to the determination result of the second determination unit 543. That is, in a case where the difference between the output signals of the two low-pass filters LP2 selected by the selection unit 545 is equal to or less than the second threshold value $\Delta F2$, the adjustment unit 544 switches the processing filter FP from the third low-pass filter 563 to the second low-pass filter 562.

For example, in a case where the selection unit 545 selects the first low-pass filter 561 and the third low-pass filter 563 as the two low-pass filters LP2, the second determination unit 543 determines whether the absolute value of the difference between the first test force measurement value FD1 and the third test force measurement value FD3 is equal to or less than the second threshold value $\Delta F2$. Then, in a case where the second determination unit 543 determines that the absolute value of the difference between the first test force measurement value FD1 and the third test force measurement value FD3 is equal to or less than the second threshold value $\Delta F2$, the adjustment unit 544 switches the processing filter FP from the third low-pass filter 563 to the second low-pass filter 562.

The selection unit 545 selects two low-pass filters LP2 from the first low-pass filter 561 to the third low-pass filter 563.

For example, in a case where the third low-pass filter 563 is set as the processing filter FP, the selection unit 545 selects the first low-pass filter 561 and the third low-pass filter 563 as the two low-pass filters LP2.

Further, for example, in a case where the second low-pass filter 562 is set as the processing filter FP, the selection unit 545 selects the first low-pass filter 561 and the second low-pass filter 562 as the two low-pass filters LP2.

In other words, the selection unit 545 selects the first low-pass filter 561 and the low-pass filter set as the processing filter FP as the two low-pass filters LP2.

The selection unit 545 selects the first low-pass filter 561 and the low-pass filter set as the processing filter FP as the two low-pass filters LP2. Therefore, the adjustment unit 544 can appropriately switch the processing filter FP between the third low-pass filter 563 and the second low-pass filter 562 on the basis of the determination result of the first determination unit 542 and the determination result of the second determination unit 543.

That is, since one of the two low-pass filters LP2 is the first low-pass filter 561, the adjustment unit 544 can adjust the frequency characteristics of the processing filter FP on the basis of the first test force measurement value FD1 having good responsiveness.

Further, since the other of the two low-pass filters LP2 is the low-pass filter set as the processing filter FP, the adjustment unit 544 can adjust the frequency characteristics of the processing filter FP on the basis of the signal used as the display signal displayed on the display device 32.

In a case where the moving speed VC is zero, that is, a case where the crosshead 10 is stopped, the moving speed VC is smaller than the threshold value VCA, and thus the adjustment unit 544 adjusts the frequency characteristics of the processing filter FP. That is, in a case where the crosshead 10 is stopped, the frequency characteristics of the processing filter FP are appropriately adjusted by the adjustment unit 544.

On the other hand, in order to satisfy the condition of the test for determining the suitability of the tensile testing machine 1, the noise component needs to be equal to or less than a predetermined value in a state where the crosshead 10 is stopped.

In the tensile testing machine 1 according to this embodiment, the frequency characteristics of the processing filter FP are appropriately adjusted in a state where the crosshead 10 is stopped, and thus a possibility of satisfying the conditions of the test can be increased.

4. Operation of Control Part

Next, the processing of the control part 53 will be described with reference to FIG. 3.

Figure 3:
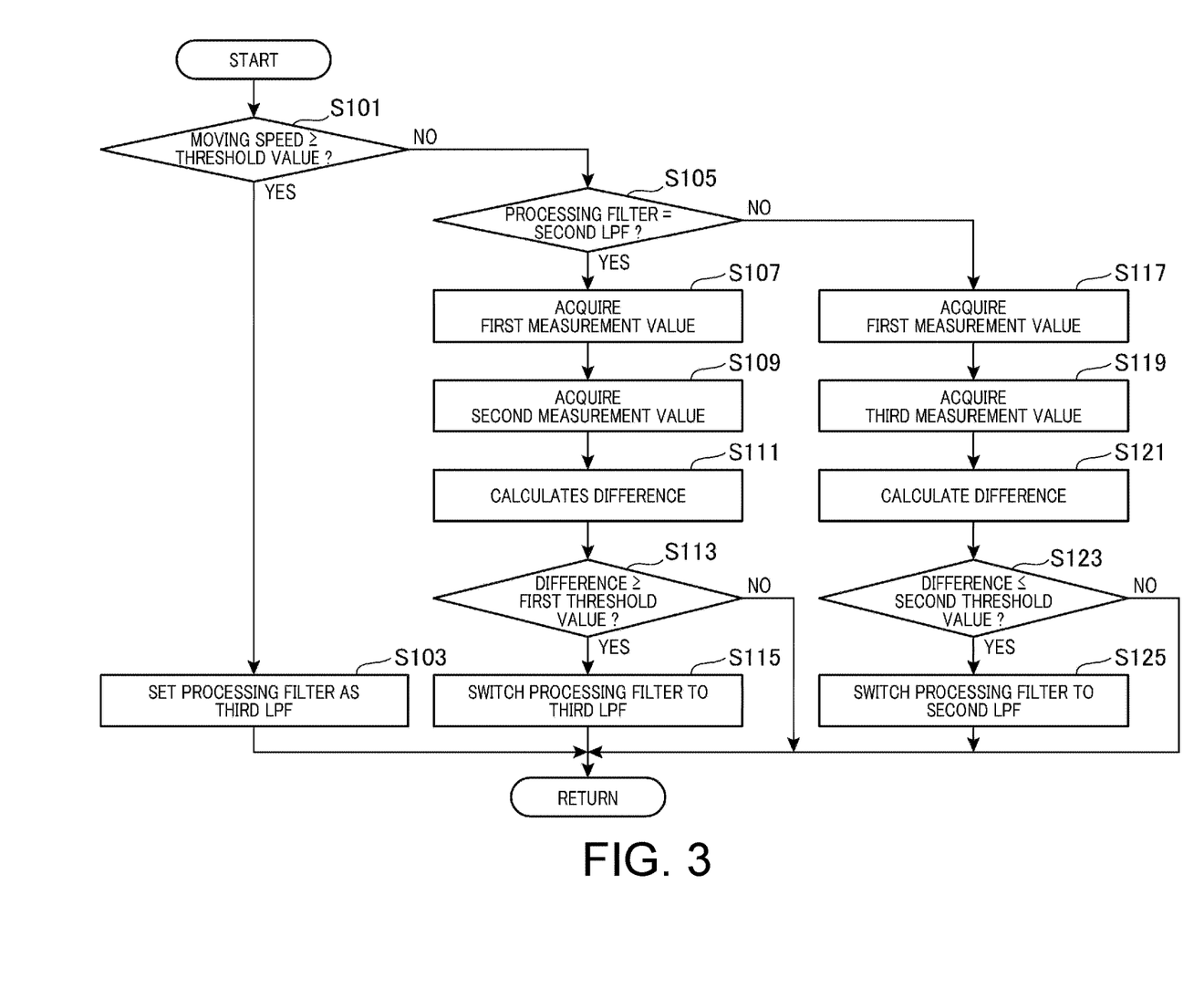
FIG. 3 is a flowchart illustrating an example of processing of a control part according to this embodiment.

FIG. 3 is a flowchart illustrating an example of processing of the control part 53 according to this embodiment.

First, in step S101, the speed determination unit 541 calculates the moving speed VC of the crosshead 10 and determines whether the moving speed VC is equal to or larger than the threshold value VCA.

In a case where the speed determination unit 541 determines that the moving speed VC is equal to or larger than the threshold value VCA (step S101; YES), the process proceeds to step S103.

Then, in step S103, the adjustment unit 544 sets the third low-pass filter 563 as the processing filter FP. Thereafter, the process returns to step S101.

In a case where the speed determination unit 541 determines that the moving speed VC is not equal to or larger than the threshold value VCA (step S101; NO), the process proceeds to step S105.

Then, in step S105, the adjustment unit 544 determines whether the second low-pass filter 562 is set as the processing filter FP.

In a case where the adjustment unit 544 determines that the second low-pass filter 562 is not set as the processing filter FP (step S105; NO), that is, a case where the third low-pass filter 563 is set as the processing filter FP, the process proceeds to step S117. In a case where the adjustment unit 544 determines that the second low-pass filter 562 is set as the processing filter FP (step S105; YES), the process proceeds to step S107.

Then, in step S107, the selection unit 454 selects the first low-pass filter 561 and the second low-pass filter 562 as the two low-pass filters LP2, and the first determination unit 542 acquires the first test force measurement value FD1.

Next, in step S109, the first determination unit 542 acquires the second test force measurement value FD2.

Next, in step S111, the first determination unit 542 calculates the difference between the first test force measurement value FD1 and the second test force measurement value FD2, that is, the absolute value of the difference between the first test force measurement value FD1 and the second test force measurement value FD2.

Next, in step S113, the first determination unit 542 determines whether the difference between the first test force measurement value FD1 and the second test force measurement value FD2 is equal to or larger than the first threshold value ΔF1.

In a case where the first determination unit 542 determines that the difference between the first test force measurement value FD1 and the second test force measurement value FD2 is not equal to or larger than the first threshold value ΔF1 (step S113; NO), the process returns to step S101. In a case where the first determination unit 542 determines that the difference between the first test force measurement value FD1 and the second test force measurement value FD2 is equal to or larger than the first threshold value ΔF1 (step S113; YES), the process proceeds to step S115.

Then, in step S115, the adjustment unit 544 switches the processing filter FP from the second low-pass filter 562 to the third low-pass filter 563. Thereafter, the process returns to step S101.

In a case where the adjustment unit 544 determines that the second low-pass filter 562 is not set as the processing filter FP (step S105; NO), that is, a case where the third low-pass filter 563 is set as the processing filter FP, in step S117, the selection unit 454 selects the first low-pass filter 561 and the third low-pass filter 563 as the two low-pass filters LP2, and the second determination unit 543 acquires the first test force measurement value FD1.

Next, in step S119, the second determination unit 543 acquires the third test force measurement value FD3.

Next, in step S121, the second determination unit 543 calculates the difference between the first test force measurement value FD1 and the third test force measurement value FD3, that is, the absolute value of the difference between the first test force measurement value FD1 and the third test force measurement value FD3.

Next, in step S123, the second determination unit 543 determines whether the difference between the first test force measurement value FD1 and the third test force measurement value FD3 is equal to or less than the second threshold value ΔF2.

In a case where the second determination unit 543 determines that the difference between the first test force measurement value FD1 and the third test force measurement value FD3 is not equal to or less than the second threshold value ΔF2 (step S123; NO), the process returns to step S101. In a case where the second determination unit 543 determines that the difference between the first test force measurement value FD1 and the third test force measurement value FD3 is equal to or less than the second threshold value ΔF2 (step S123; YES), the process proceeds to step S125.

Then, in step S125, the adjustment unit 544 switches the processing filter FP from the third low-pass filter 563 to the second low-pass filter 562. Thereafter, the process returns to step S101.

Steps S115 and S125 correspond to an example of an "adjusting".

In this manner, the adjustment unit 544 adjusts the frequency characteristics of the processing filter FP which removes the noise component included in the test force measurement value FD output from the load cell 14. Therefore, the burden on the operator can be reduced.

Specifically, in a case where the first determination unit 542 determines that the absolute value of the difference between the first test force measurement value FD1 and the second test force measurement value FD2 is equal to or larger than the first threshold value ΔF1, the adjustment unit 544 switches the processing filter FP from the second low-pass filter 562 to the third low-pass filter 563. Therefore, high frequency noise can be appropriately removed.

In a case where the second determination unit 543 determines that the absolute value of the difference between the first test force measurement value FD1 and the third test force measurement value FD3 is equal to or less than the second threshold value ΔF2, the adjustment unit 544 switches the processing filter FP from the third low-pass filter 563 to the second low-pass filter 562. Therefore, the responsiveness of the processing filter FP can be appropriately improved.

In a case where the moving speed VC is equal to or larger than the threshold value VCA, the adjustment unit 544 sets the processing filter FP to the third low-pass filter 563. In a case where the moving speed VC is equal to or larger than the threshold value VCA, the amplitude of the high frequency noise is large, and thus the high frequency noise can be appropriately suppressed by setting the processing filter FP to the third low-pass filter 563.

5. Aspects and Effects

It is understood by those skilled in the art that the above-described embodiment and modifications are a specific example of the following aspects.
(Item 1)
A material testing machine according to a first aspect includes: a processing filter that removes a noise component included in a detection signal output from a sensor; and an adjustment unit that adjusts a frequency characteristic of the processing filter.

The material testing machine described in Item 1 includes: the processing filter that removes the noise component included in the detection signal output from the sensor; and the adjustment unit that adjusts the frequency characteristic of the processing filter.

Therefore, it is not necessary for the operator to adjust the frequency characteristics of the processing filter. Therefore, the burden on the operator can be reduced.
(Item 2)
In the material testing machine described in Item 1, an output signal of the processing filter is used as a display signal to be displayed on a display.

According to the material testing machine described in Item 2, the output signal of the processing filter is used as the display signal to be displayed on the display.

Therefore, the noise component included in the display signal can be appropriately removed by the processing filter. Therefore, an appropriate display signal can be displayed on the display.
(Item 3)
In the material testing machine described in Item 1 or 2, the adjustment unit receives a detection signal output from the sensor, and adjusts the frequency characteristic of the processing filter on the basis of a difference between output signals of two low-pass filters having different frequency characteristics.

According to the material testing machine described in Item 3, the adjustment unit receives the detection signal output from the sensor, and adjusts the frequency characteristic of the processing filter on the basis of the difference between the output signals of the two low-pass filters having different frequency characteristics.

Therefore, the adjustment unit can appropriately adjust the frequency characteristic of the processing filter.
(Item 4)
The material testing machine described in Item 3 further includes: a first determination unit that determines whether the difference between the output signals of the two low-pass filters is equal to or larger than a first threshold value, in which the processing filter is configured by a low-pass filter, and the adjustment unit decreases a cutoff frequency of the processing filter according to a determination result of the first determination unit.

According to the material testing machine described in Item 4, in a case where the difference between the output signals of the two low-pass filters is equal to or larger than the first threshold value, the adjustment unit decreases the cutoff frequency of the processing filter.

Therefore, the adjustment unit can appropriately remove the high frequency noise included in the output of the processing filter.
(Item 5)
The material testing machine described in Item 4 further includes: a first low-pass filter having a cutoff frequency of a first frequency; a second low-pass filter having a cutoff frequency of a second frequency lower than the first frequency; a third low-pass filter having a cutoff frequency of a third frequency lower than the second frequency; and a selection unit that selects the two low-pass filters from among the first low-pass filter, the second low-pass filter, and the third low-pass filter, in which, in a case where the second low-pass filter is set as the processing filter, the selection unit selects the first low-pass filter and the second low-pass filter as the two low-pass filters, and the adjustment unit switches the processing filter from the second low-pass filter to the third low-pass filter according to the determination result of the first determination unit.

According to the material testing machine described in Item 5, in a case where the difference between the output signals of the two low-pass filters is equal to or larger than the first threshold value, the adjustment unit switches the processing filter from the second low-pass filter to the third low-pass filter.

Therefore, the high frequency noise included in the output of the processing filter can be appropriately removed with a simple configuration.

(Item 6)

The material testing machine described in Item 3 further includes: a second determination unit that determines whether a difference between output signals of the two low-pass filters is equal to or less than a second threshold value, in which the processing filter is configured by a low-pass filter, and the adjustment unit increases a cutoff frequency of the processing filter according to a determination result of the second determination unit.

According to the material testing machine described in Item 6, in a case where the difference between the output signals of the two low-pass filters is equal to or less than the second threshold value, the adjustment unit increases the cutoff frequency of the processing filter.

Therefore, the adjustment unit can appropriately improve the responsiveness of the processing filter.

(Item 7)

The material testing machine described in Item 6 further includes: a first low-pass filter having a cutoff frequency of a first frequency; a second low-pass filter having a cutoff frequency of a second frequency lower than the first frequency; a third low-pass filter having a cutoff frequency of a third frequency lower than the second frequency; and a selection unit that selects the two low-pass filters from among the first low-pass filter, the second low-pass filter, and the third low-pass filter, in which, in a case where the third low-pass filter is set as the processing filter, the selection unit selects the first low-pass filter and the third low-pass filter as the two low-pass filters, and the adjustment unit switches the processing filter from the third low-pass filter to the second low-pass filter according to the determination result of the second determination unit.

According to the material testing machine described in Item 7, in a case where the difference between the output signals of the two low-pass filters is equal to or less than the second threshold value, the adjustment unit switches the processing filter from the third low-pass filter to the second low-pass filter.

Therefore, the responsiveness of the processing filter can be appropriately improved with a simple configuration.

(Item 8)

According to a second aspect, a control method of a material testing machine which includes a processing filter of removing a noise component included in a detection signal output from a sensor, includes: adjusting a frequency characteristic of the processing filter.

According to the control method of the material testing machine described in Item 8, the same operations and effects as those of the material testing machine described in Item 1 are obtained.

6. Other Embodiments

Incidentally, the tensile testing machine 1 according to this embodiment is merely an example of an aspect of the material testing machine according to the present invention, and can be arbitrarily modified and applied without departing from the gist of the present invention.

For example, in this embodiment, a case where the material testing machine is the tensile testing machine 1 has been described, but this embodiment is not limited thereto.

The material testing machine may apply a test force to the test piece TP and deform the test piece TP to perform a material test. For example, the material testing machine may be a compression testing machine, a bending testing machine, or a torsion testing machine.

In this embodiment, a case where the "sensor" is the load cell 14 has been described, but the "sensor" may be, for example, the displacement sensor 15.

In this embodiment, the processing filter FP is configured by a low-pass filter, but it is sufficient if the processing filter FP removes the noise component included in the detection signal output from the sensor. The processing filter FP may include, for example, a band-pass filter.

In this embodiment, the low-pass filter 56 includes three low-pass filters, that is, the first low-pass filter 561 to the third low-pass filter 563, but the low-pass filter 56 may include two low-pass filters. In this case, the configuration and the process can be simplified. Further, the low-pass filter 56 may include four or more low-pass filters. In this case, the frequency characteristics of the processing filter FP can be further appropriately adjusted.

Each functional unit illustrated in FIGS. 1 and 2 illustrates a functional configuration, and a specific implementation form is not particularly limited. That is, hardware individually corresponding to each functional unit does not necessarily need to be mounted, and it is of course possible to have a configuration in which functions of a plurality of functional units are realized by one processor executing a program. Further, some of the functions implemented by software in the above embodiments may be implemented by hardware, or some of the functions implemented by hardware may be implemented by software.

In the processing units of the flowchart illustrated in FIG. 3, the processing of the control part 53 are divided to facilitate understanding according to main processing contents. The division method and the name of the processing units illustrated in the flowchart of FIG. 3 are not restrictive. According to the processing content, the processing units can be divided into more processing units, or one processing unit can be divided to include more processing. Further, the processing order of the above flowchart is not limited to the illustrated example.

The control method of the tensile testing machine 1 can be realized by causing the processor 54 included in the control part 53 to execute a control program corresponding to the control method of the tensile testing machine 1. Further, the control program can also be recorded in a computer-readable recording medium. As the recording medium, a magnetic or optical recording medium or a semiconductor memory device can be used. Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium. Further, the recording medium may be a non-volatile storage device such as a RAM, a ROM, or an HDD which is an internal storage device included in the control part 53. Further, the control program corresponding to the control method of the tensile testing machine 1 is stored in a server device or the like, and the control program is downloaded from the server device to the control part 53, whereby the control method of the tensile testing machine 1 can be realized.

REFERENCE SIGNS LIST

1 TENSILE TESTING MACHINE (MATERIAL TESTING MACHINE)
2 TENSILE TESTING MACHINE BODY
4 CONTROL UNIT
10 CROSSHEAD
12 LOAD MECHANISM
14 LOAD CELL (SENSOR)
15 DISPLACEMENT SENSOR
20 ROTARY ENCODER
21 UPPER GRIPPER
22 LOWER GRIPPER
26 TABLE
28, 29 SCREW ROD
30 INTEGRATED CONTROL DEVICE
32 DISPLAY DEVICE (DISPLAY)
34 TEST PROGRAM EXECUTION DEVICE
40 SIGNAL INPUT/OUTPUT UNIT
42 FIRST SENSOR AMPLIFIER
43 COUNTER CIRCUIT
44 SERVO AMPLIFIER
45 SECOND SENSOR AMPLIFIER
50 CONTROL CIRCUIT UNIT
51 COMMUNICATION UNIT
52 FEEDBACK CONTROL PART
53 CONTROL PART
54 PROCESSOR
541 SPEED DETERMINATION UNIT
542 FIRST DETERMINATION UNIT
543 SECOND DETERMINATION UNIT
544 ADJUSTMENT UNIT
545 SELECTION UNIT
55 MEMORY
56 LOW-PASS FILTER
561 FIRST LOW-PASS FILTER
562 SECOND LOW-PASS FILTER
563 THIRD LOW-PASS FILTER
FA RESPONSE FREQUENCY
FC CUTOFF FREQUENCY
FC1 FIRST FREQUENCY
FC2 SECOND FREQUENCY
FC3 THIRD FREQUENCY
FD TEST FORCE MEASUREMENT VALUE
FD1 FIRST TEST FORCE MEASUREMENT VALUE
FD2 SECOND TEST FORCE MEASUREMENT VALUE
FD3 THIRD TEST FORCE MEASUREMENT VALUE
FP PROCESSING FILTER
LP2 TWO LOW-PASS FILTERS
SG1 TEST FORCE MEASUREMENT SIGNAL
SG2 ROTATION MEASUREMENT SIGNAL
SG3 ELONGATION MEASUREMENT SIGNAL
TP TEST PIECE
VC MOVING SPEED
VCA THRESHOLD VALUE
XD DISPLACEMENT MEASUREMENT VALUE
ΔF1 FIRST THRESHOLD VALUE
ΔF2 SECOND THRESHOLD VALUE

What is claimed is:

1. A material testing machine comprising:
a processing filter that removes a noise component included in a detection signal output from a sensor; and
an adjustment unit that adjusts a frequency characteristic of the processing filter,
wherein the adjustment unit receives the detection signal output from the sensor, and adjusts the frequency characteristic of the processing filter on a basis of a difference between output signals of two low-pass filters having different frequency characteristics and serving as the processing filter.

2. The material testing machine according to claim 1, wherein
an output signal of the processing filter is used as a display signal to be displayed on a display.

3. The material testing machine according to claim 1, further comprising:
a first determination unit that determines whether the difference between the output signals of the two low-pass filters is equal to or larger than a first threshold value, wherein
the processing filter is configured by a low-pass filter, and
the adjustment unit decreases a cutoff frequency of the processing filter according to a determination result of the first determination unit.

4. The material testing machine according to claim 3, further comprising:
a first low-pass filter having a cutoff frequency of a first frequency;
a second low-pass filter having a cutoff frequency of a second frequency lower than the first frequency;
a third low-pass filter having a cutoff frequency of a third frequency lower than the second frequency; and
a selection unit that selects the two low-pass filters from among the first low-pass filter, the second low-pass filter, and the third low-pass filter, wherein
in a case where the second low-pass filter is set as the processing filter, the selection unit selects the first low-pass filter and the second low-pass filter as the two low-pass filters, and
the adjustment unit switches the processing filter from the second low-pass filter to the third low-pass filter according to the determination result of the first determination unit.

5. The material testing machine according to claim 1, further comprising:
a second determination unit that determines whether a difference between output signals of the two low-pass filters is equal to or less than a second threshold value, wherein
the processing filter is configured by a low-pass filter, and
the adjustment unit increases a cutoff frequency of the processing filter according to a determination result of the second determination unit.

6. The material testing machine according to claim 5, further comprising:
a first low-pass filter having a cutoff frequency of a first frequency;
a second low-pass filter having a cutoff frequency of a second frequency lower than the first frequency;
a third low-pass filter having a cutoff frequency of a third frequency lower than the second frequency; and
a selection unit that selects the two low-pass filters from among the first low-pass filter, the second low-pass filter, and the third low-pass filter, wherein
in a case where the third low-pass filter is set as the processing filter, the selection unit selects the first low-pass filter and the third low-pass filter as the two low-pass filters, and
the adjustment unit switches the processing filter from the third low-pass filter to the second low-pass filter according to the determination result of the second determination unit.

7. A control method of a material testing machine which includes a processing filter of removing a noise component included in a detection signal output from a sensor, the control method comprising:
  receiving the detection signal output from the sensor;
  adjusting a frequency characteristic of the processing filter on a basis of a difference between output signals of two low-pass filters having different frequency characteristics and serving as the processing filter.

* * * * *